United States Patent [19]

Geiger

[11] Patent Number: 4,663,053

[45] Date of Patent: May 5, 1987

[54] METHOD FOR INHIBITING CORROSION AND DEPOSITION IN AQUEOUS SYSTEMS

[75] Inventor: Gary E. Geiger, Philadelphia, Pa.

[73] Assignee: Betz Laboratories, Inc., Trevose, Pa.

[21] Appl. No.: 373,903

[22] Filed: May 3, 1982

[51] Int. Cl.$^4$ ............................................. C02F 5/14
[52] U.S. Cl. ..................................... 210/699; 210/700;
 210/701; 252/181; 252/389.21; 252/389.23;
 252/389.52; 422/15; 422/17; 422/19
[58] Field of Search ........................... 210/696–701;
 252/180, 181, 387, 388, 389.21, 389.23, 389.52,
 389.54; 422/15–19

[56] References Cited

U.S. PATENT DOCUMENTS

| | | | |
|---|---|---|---|
| 2,764,576 | 9/1956 | Blaser | 260/79.3 |
| 2,970,959 | 2/1961 | Jones | 252/181 |
| 3,510,436 | 5/1970 | Silverstein et al. | 252/390 |
| 3,532,639 | 10/1970 | Hatch | 252/387 |
| 3,699,048 | 10/1972 | Krueger et al. | 210/701 |
| 3,803,047 | 4/1974 | Hwa | 252/181 |
| 3,803,048 | 4/1974 | Hwa | 252/181 |
| 3,837,803 | 9/1974 | Carter et al. | 252/181 |
| 3,891,568 | 6/1975 | Nishio et al. | 252/181 |
| 4,018,701 | 4/1977 | Ralston et al. | 422/18 |
| 4,018,702 | 4/1977 | Boffardi et al. | 252/180 |
| 4,048,066 | 9/1977 | Cuisia et al. | 210/701 |
| 4,066,398 | 1/1978 | Hwa | 252/390 |
| 4,089,796 | 5/1978 | Harris et al. | 252/181 |
| 4,149,969 | 4/1979 | Robitaille et al. | 252/181 |
| 4,209,398 | 6/1980 | Ii et al. | 422/15 |
| 4,255,259 | 3/1981 | Hwa et al. | 210/699 |
| 4,288,327 | 9/1981 | Godlewski et al. | 210/698 |
| 4,324,684 | 4/1982 | Geiger et al. | 422/16 |
| 4,372,870 | 2/1983 | Snyder et al. | 210/701 |
| 4,374,733 | 2/1983 | Snyder et al. | 210/701 |
| 4,432,879 | 2/1984 | Greaves et al. | 210/699 |

*Primary Examiner*—Peter Hruskoci
*Attorney, Agent, or Firm*—Alexander D. Ricci; Bruce E. Peacock; James D. Dee

[57] ABSTRACT

A corrosion inhibition and scale control method and composition are disclosed. The method comprises, adding to a cooling water system, for which protection is desired, a water soluble zinc salt, a water soluble sulfonated styrene/maleic anhydride (SSMA) copolymer and an organo-phosphorus acid compound. A corrosion inhibitor compound such as a 1,2,3-triazole or thiazole compound may be added to afford additional protection. Molybdate salts may also be included as optional corrosion inhibitors. A cellulose gum material and/or water soluble acrylic acid polymer or copolymer may be conjointly used with the SSMA copolymer.

24 Claims, No Drawings

METHOD FOR INHIBITING CORROSION AND DEPOSITION IN AQUEOUS SYSTEMS

The present invention relates to a composition and method for inhibiting corrosion and scale deposition of metallic surfaces in cooling water systems. Specifically, the invention relates to the use of a composition comprising a soluble zinc salt, a water soluble sulfonated styrene/maleic anhydride copolymer, and an organo-phosphorus acid component or water soluble salt thereof. An azole compound or a soluble molybdate salt may be added for increased corrosion protection. Also, other polymeric materials, including water soluble cellulose gum polymers, and water soluble acrylic acid polymers and copolymers may be used conjointly with the sulfonated styrene/maleic anhydride copolymer.

The compositions of the present invention have been found effective for simultaneously controlling both corrosion and scaling deposition in a wide variety of cooling water systems and are exceptionally effective in those cooling water systems having a high scaling potential and operating under low flow and/or high heat load conditions. Heretofore, these latter conditions have made it difficult, if not impossible, to effectively and economically prevent both corrosion and formation of scales simultaneously.

The term "cooling water" is applied wherever water is circulated through equipment to absorb and carry away heat. This definition includes air conditioning systems, engine jacket systems, refrigeration systems as well as the multitudes of industrial heat exchange operations, such as found in oil refineries, chemical plants, steel mills, etc.

The use of a recirculating system, in which a cooling tower, spray pond, evaporative condenser and the like serve to dissipate heat, permits great economy in make-up water requirements. In a cooling water system employing a cooling tower, water is circulated through the heat transfer equipment and subsequently cooled by evaporation of a part of the circulating water as the water is passed over the cooling tower. By virtue of the evaporation which takes place in cooling, the dissolved solids and suspended solids in the water become concentrated. The circulating water becomes more concentrated than the make-up water due to this evaporation loss.

"Cycles of concentration" is the phrase employed to indicate the degree of concentration of the circulating water as compared with the make-up. For example, 2.0 cycles of concentration indicates the circulating water is twice the concentration of the make-up water. To maintain the circulating water at some given cycles of concentration, a portion of the circulating water must be physically removed from the system and replaced with fresh make-up water to maintain a steady-state condition. The circulating water removed from the system is referred to as "blowdown".

The make-up water employed for recirculating systems is obtained from surface or well water sources. These waters normally contain a variety of dissolved salts, the abundance and composition of which will, of course, depend on the source of the make-up water. Generally, the make-up water will contain a preponderance of the alkaline earth metal cations, primarily calcium and magnesium, and such anions as silicate, sulfate, bicarbonate and carbonate. As the water is concentrated by the evaporative process, precipitation of cation/anion combinations, e.g., calcium carbonate, calcium silicate, magnesium silicate, etc., will occur whenever the solubility of the particular cation/anion combination is exceeded. If the precipitation (crystallization) occurs at a metallic surface and adheres to it, the resultant deposit is referred to as "scale". Some of the factors which affect scale formation are temperature, rate of heat transfer, water velocity, the dissolved solids concentration, cycles of concentration, system retention time and pH of the water.

Some naturally occurring waters have similar scaling potentials in their uncycled state.

Preventing the corrosion and scaling of industrial heat transfer equipment is essential to the efficient and economical operation of a cooling system. Excessive corrosion of metallic surfaces can cause the premature failure of process equipment, necessitating down time for the replacement or repair of the equipment. Additionally, the buildup of corrosion products on heat transfer surfaces impedes water flow and reduces heat transfer efficiency, thereby limiting production or requiring down time for cleaning. Reduction in efficiency will also result from scaling deposition which retards heat transfer and hinders water flow.

Scale can also cause rapid localized corrosion and subsequent penetration of metallic surfaces through the formation of differential oxygen concentration cells. The localized corrosion resulting from differential oxygen cells originating from deposits is commonly referred to as "under-deposit corrosion".

With the advent of strict Federal, State and Municipal environmental controls and water shortages throughout the country, recirculating cooling water systems were, in many cases, forced to operate at higher cycles of concentrations to reduce both water consumption and the volume of blowdown from the system. As the cycles of concentration increase, scaling and corrosion problems become more severe because of the higher dissolved salt concentrations that are encountered. Generally, the cooling water is more prone to produce scaling than corrosion at the more alkaline pH's, pH>7.5, while at near neutral pH's, pH=6 to 7.5, the cooling water is more prone to corrosion than scaling.

To avoid scaling problems, acid can be added to the cooling water to maintain the pH within a range where scaling can be controlled. However, the addition of acid, normally sulfuric or hydrochloric acid, increases the concentration of the aggressive chloride or sulfate ions and thus aggravates the corrosion problem. When acid is added, its addition must be carefully regulated since overfeeds can depress the pH to the point where severe corrosion can result, while underfeeds could allow the pH to increase to the point where scaling cannot be controlled.

PRIOR ART

Sulfonated styrene/maleic anhydride (SSMA) copolymers are well known. For instance, U.S. Pat. No. 4,288,327 (Godlewski et al) discloses the use of such copolymers to control, reduce, and/or prevent scale and sludge deposits. Of similar import is U.S. Pat. No. 4,048,066 (Cuisia).

Combined utilization of SSMA copolymers and soluble organo-phosphonic acid compounds as sludge conditioning agents in steam generating boilers is taught in U.S. Pat. No. 4,255,259 and 4,306,991. However, as these patents are directed specifically toward boiler systems, in contrast to the cooling water environment of the present invention, there is no direction or impetus in these references for an artisan to include a zinc ion source in the treatment. The artisan will readily appreciate that the inclusion of zinc in a boiler treatment program will result in undesirable sludge formation.

In the cooling water environment of the present invention, the organo-phosphorus acid compounds alone do not perform satisfactorily and require additional components to improve the corrosion control capabilities. U.S. Pat. Nos. 3,837,803, 4,149,969, 4,003,047 and 3,803,048 can be noted as disclosing use of such phosphorus acid compounds.

When the phosphorus acid compounds are combined with commonly used corrosion inhibitors for cooling water treatment, e.g., inorganic phosphate, zinc, etc., improved corrosion control is obtained. However, these combinations are limited in their ability to simultaneously control corrosion and maintain heat transfer surfaces free of scale. Furthermore, the degree of corrosion and scaling protection that can be achieved with the organo-phosphorus acid combinations in dependent on both the cooling water chemistry (pH, calcium hardness, carbonate and bicarbonate concentrations) and the cooling systems operating conditions (water velocity, heat load, water temperature, cycles of concentration).

The performance of treatment programs containing combinations of zinc and organo-phosphorus acid compounds is particularly dependent on the cooling water chemistry and operating conditions since both the zinc and the organo-phosphorus acid compounds can precipitate as insoluble salts and thereby adversely affect corrosion and scaling control. Zinc becomes exceedingly insoluble with increasing temperature and pH. Precipitation of the soluble zinc in the cooling water minimizes or eliminates the ability of the zinc to fulfill its intended corrosion inhibition function. Additionally, the precipitation and deposition of insoluble zinc salts at hot heat transfer surfaces can retard heat transfer and cause under-deposit corrosion. Precipitation of insoluble calcium phosphonate can also occur in waters sufficiently high in pH and/or calcium hardness. Similar to the precipitation of zinc, the solubility of the calcium phosphonate salts decreases with increasing pH and temperature. Precipitation of phosphonate in the circulating water can reduce the phosphonate concentration below that which is required for effective scaling suppression and thereby result in excessive scaling from naturally occurring salts, e.g., calcium carbonate. Scaling, and the attendant under-deposit corrosion, caused by calcium phosphonate salts, can also occur at the heat transfer surface by virtue of the higher temperatures that exist there. Due to the limited solubility of both the phosphonate and zinc salts, at any given condition of pH, temperature, calcium hardness, etc., the concentration of both the organo-phosphorus acid component and zinc salts must be stringently controlled, since overfeeds of either material can cause chemical scaling, while underfeeds can result in corrosion and/or scaling from naturally occurring salts. Conversely, at any given concentration of zinc and phosphonic acid compound, the water chemistry and system operating parameters must be closely controlled to avoid potential problems.

The aforementioned problems encountered with compositions containing zinc salts and phosphonic acid components are particularly troublesome with cooling water systems operating at alkaline pH, generally $pH \geq 8$, and having high calcium carbonate scaling potentials.

Accordingly, there is a need in the art to provide a treatment program which can effectively and simultaneously inhibit corrosion and scaling of metallic surfaces in cooling water systems of high scaling potential.

DESCRIPTION OF THE INVENTION

It has surprisingly been discovered that a treatment program incorporating (1) a water soluble zinc salt, (2) a water soluble sulfonated styrene/maleic anhydride copolymer (SSMA), (3) an organo-phosphorus acid compound, and optionally, (4) an azole compound, and/or (5) a soluble molybdate salt, provides enhanced corrosion control in cooling water systems, without leading to the formation of excessive scale. Other polymers, such as water soluble cellulose gum material or acrylic acid polymers and copolymers may also be used with the SSMA copolymer.

The treatment program of the present invention has been found to be applicable to a wide variety of cooling water chemistries and is surprisingly effective in water systems having a high scaling potential.

Although the disclosed treatment program is extremely effective for cooling water systems operating at $pH \geq 8$ and supersaturated with respect to calcium carbonate, it is generally applicable to cooling waters having a pH of about 7 to 9.5, and a Langelier Saturation Index of $\geq 0.8$. (See Betz, Handbook of Industrial Water Conditioning, Eighth Edition, 1980, pages 177-178.)

The copolymers used in the present invention comprise sulfonated styrene moieties, i.e.,

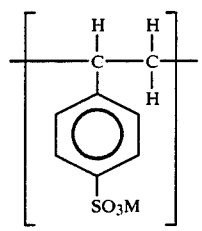

and moities derived from maliec anhydride, i.e.,

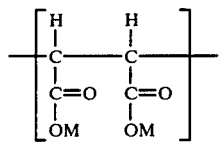

Preferably, the copolymers contain a mole ratio of styrene moieties to maleic anhydride derived moieties of from 1:4 to about 5:1. The molecular weight of these copolymers can range from about 500 to about 100,000. Preferred molecular weights range from 1,000 to 10,000. One commercially available copolymer is Versa TL-3, sold by National Starch. This particular copolymer has a monomer ratio of SS:MA of 3:1 and has a molecular weight of between about 3,000-5,000.

One procedure for producing these polymers is to copolymerize styrene with maleic anhydride in the desired monomer ratios. After the polymer is resolubilized by producing the various water-soluble salts (alkali metal), the polymer is then sulfonated in accordance with well-known techniques. The degree of sulfonation can vary but substantially complete sulfonation on the styrene moieties is preferred.

Conversion of the polymers into the water soluble salts such as the alkali metal salt forms is accomplished by normal methods. Therefore M in the above formulae may represent $NH_4$, H, Na, K, etc., or mixtures.

As is apparent, another manner of producing the subject copolymers is to first sulfonate the styrene monomer utilizing a technique such as described in U.S. Pat. No. 2,764,576 and then copolymerize the resulting sulfonated styrene with maleic anhydride. Other details of the methods and parameters of the copolymerization may be discerned from U.S. Pat. No. 2,723,956.

The organo-phosphorus acid compounds, useful in conjunction with the present invention, are those having a carbon to phosphorus bond, i.e.,

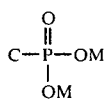

Compounds within the scope of the above description generally are included in one of perhaps 4 categories which are respectively expressed by the following general formulas (6, 7, 8, and 9):

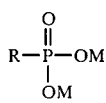 (6)

where R is a lower alkyl having from about one to seven carbon atoms, e.g., methyl, ethyl, butyl, propyl, isopropyl, pentyl, isopentyl, hexyl and heptyl; substituted lower alkyl of from one to seven carbon atoms, e.g., hydroxyl, carboxylated, and amino-substituted alkyls; a mononuclear aromatic (aryl) radical, e.g., phenyl, or a substituted mononuclear aromatic compound, e.g., hydroxyl, amino, lower alkyl substituted aromatic, e.g., tolylphosphonic acid; and M is a water-soluble cation, e.g., sodium, potassium, ammonium, lithium, etc. or hydrogen.

Specific examples of compounds which are encompassed by this formula include:

methylphosphonic acid $CH_3PO_3H_2$ ethylphosphonic acid $CH_3CH_2PO_3H_2$ 2-hydroxyethylphosphonic acid

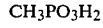

2-aminoethylphosphonic acid

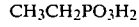

2-phosphonobutane 1,2,4-tricarboxylic acid

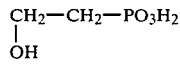

isopropylphosphonic acid

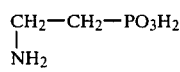

benzene phosphonic acid $C_6H_5PO_3H_2$ benzylphosphonic acid $C_6H_5CH_2PO_3H_2$

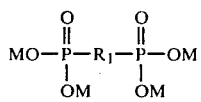 (7)

where $R_1$ is an alkylene having from about one to about 12 carbon atoms or a substituted alkylene having from about 1 to about 12 carbon atoms, e.g., hydroxyl, amino, etc., substituted alkylenes, and M is as earlier defined for (6) above.

Specific exemplary compounds and their respective formulas which are encompassed by the above formula (7) are as follows:

methylene diphosphonic acid
$H_2O_3PCH_2PO_3H_2$ ethylidene diphosphonic acid $H_2O_3PCH(CH_3)PO_3H_2$ isopropylidene diphosphonic acid $(CH_3)_2C(PO_3H_2)_2$ 1-hydroxyethylidene 1,1-diphosphonic acid (HEDP)

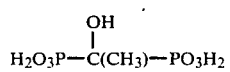

(This is preferred.)
hexamethylene diphosphonic acid $H_2O_3PCH_2(CH_2)_4CH_2PO_3H_2$ trimethylene diphosphonic acid $H_2O_3P(CH_2)_3PO_3H_2$ decamethylene diphosphonic acid $H_2O_3P(CH_2)_{10}PO_3H_2$ 1-hydroxypropylidene 1,1-diphosphonic acid $CH_3CH_2C(OH)(PO_3H_2)_2$ 1,6-dihydroxy-1,6-dimethylhexamethylene-1,6-diphosphonic acid $H_2O_3PC(CH_3)(OH)(CH_2)_4C(CH_3)(OH)PO_3H_2$ 1,2-dihydroxy-1,2-diethylethylene-1,2-diphosphonic acid $H_2O_3PC(OH)(C_2H_5)(OH)(C_2H_5)CPO_3H_2$ $$\begin{matrix} R_3 \\ \phantom{R}\diagdown \\ \phantom{RR}N-R_2-\overset{\overset{\displaystyle O}{\|}}{\underset{\underset{\displaystyle OM}{|}}{P}}-OM \\ \phantom{R}\diagup \\ R_4 \end{matrix} \qquad (8)$$

where $R_2$ is a lower alkylene having from about one to about four carbon atoms, or an amine or hydroxy substituted lower alkylene; $R_3$ is [$R_2$—$PO_3M_2$], H, OH, $NH_2$, substituted amino, an alkyl having from one to six carbon atoms, a substituted alkyl of from one to six carbon atoms (e.g., OH, $NH_2$ substituted), a mononuclear aromatic radical and a substituted mononuclear aromatic radical (e.g., OH, $NH_2$ substituted); $R_4$ is $R_3$ or the group represented by the formula $$\left[\left(\begin{matrix} R_5 \\ | \\ C \\ | \\ R_6 \end{matrix}\right)_n \!\!-\!\! \underset{\underset{\displaystyle R_7}{|}}{N}\!\!-\!\!\right]_y \!\!-\!\! R_2\!\!-\!\!\overset{\overset{\displaystyle O}{\|}}{\underset{\underset{\displaystyle OM}{|}}{P}}\!\!-\!\!OM$$

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); $R_7$ is $R_5$, $R_6$, or the group $R_2$—$PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrilo-tris(methylene phosphonic acid)

$N(CH_2PO_3H_2)_3$ imino-di(methylene phosphonic acid)

$NH(CH_2PO_3H_2)_2$ n-butylamino-N,N-di(methylene phosphonic acid)

$C_4H_9N(CH_2PO_3H_2)_2$ decyolamino-N,N-di(methylene phosphonic acid)

$C_{10}H_{21}N(CH_2PO_3H_2)_2$ trisodiumpentadecylamino-N,N-dimethylene phosphonate $C_{15}H_{31}N(CH_2PO_3HNa)(CH_2PO_3Na_2)$ n-butylamino-N,N-di(ethylene phosphonic acid)

$C_4H_9N(CH_2CH_2PO_3H_2)_2$ tetrasodium-n-butylamino-N,N-di(methylene phosphonate)

$C_4H_9N(CH_2PO_3Na_2)_2$ triammonium tetradecylamino-N,N-di(methylene phosphonate)

$C_{14}H_{29}N(CH_2PO_3(NH_4)_2)CH_2PO_3HNH_4$ phenylaminodi-N,N-(methylene phosphonic acid)

$C_6H_5N(CH_2PO_3H_2)_2$ 4-hydroxyphenylamino-N,N-di(methylene phosphonic acid)

$HOC_6H_4N(CH_2PO_3H_2)_2$

N-propylphenylamino-N,N-di(methylene phosphonic acid)

$C_6H_5(CH_2)_3N(CH_2PO_3H_2)_2$ tetrasodiummethylphenyl-N,N-aminodi(methylene phosphonic acid)

$C_6H_5(CH_2)_2N(CH_2PO_3Na_2)_2$ ethylene diamine-N,N,N',N'-tetra(methylene phosphonic acid)

$(H_2O_3PCH_2)_2N(CH_2)_2N(CH_2PO_3H_2)_2$ trimethylene diamine-N,N,N',N'-tetra(methylene phosphonic acid)

$(H_2O_3PCH_2)_2N(CH_2)_3N(CH_2PO_3H_2)_2$ heptamethylene diamine-N,N,N',N'-tetra(methylene phosphonic acid)

$(H_2O_3PCH_2)_2N(CH_2)_7N(CH_2PO_3H_2)_2$ decamethylene diamine-N,N,N',N'-tetra(methylene phosphonic acid)

$(H_2O_3PCH_2)_2N(CH_2)_{10}N(CH_2PO_3H_2)_2$ hexamethylene diamine-N,N,N',N'-tetra(methylene phosphonic acid)

$(H_2O_3PCH_2)_2N(CH_2)_6N(CH_2PO_3H_2)_2$ tetradecamethylenediamine-N,N,N',N'-tetra(methylene phosphonic acid)

$(H_2O_3PCH_2)_2N(CH_2)_{14}N(CH_2PO_3H_2)_2$ ethylenediamine-N,N,N',N'-tri(methylene phosphonic acid)

$(H_2O_3PCH_2)_2N(CH_2)_2NHCH_2PO_3H_2$ ethylenediamine-N,N'-di(methylene phosphonic acid)

H₂O₃PCH₂NH(CH₂)₂NHCH₂PO₃H₂ n-hexylamine-N,N-di(methylene phosphonic acid)

C₆H₁₃N(CH₂PO₃H₂)₂ diethylenetriamine-N,N,N',N'',N''-penta(methylene phosphonic acid)

(H₂O₃PCH₂)₂N(CH₂)₂N(CH-
2PO₃H₂)(CH₂)₂N(CH₂PO₃H₂)₂ ethanolamine-N,N-di(methylene phosphonic acid)

HO(CH₂)₂N(CH₂PO₃H₂)₂ n-hexylamino-N-(isopropylidene phosphonic acid)-N-methylene phosphonic acid

C₆H₁₃N(C(CH₃)₂PO₃H₂)(CH₂PO₃H₂)

trihydroxymethylmethylamino-N,N-di(methylene phosphonic acid)

(HOCH₂)₃CN(CH₂PO₃H₂)₂ triethylenetetraamine-N,N,N',N'',N''',N'''',N''''-hexa(methylene phosphonic acid)

(H₂O₃PCH₂)₂N(CH₂)₂N(CH₂PO₃H₂)—(CH₂)₂N(CH₂PO₃H₂)(CH₂)₂N(CH₂PO₃—H₂)₂

N-monoethanoldiethylenetriamine-N,N'',N'''-tri(methylene phosphonic acid)

HOCH₂CH₂N(CH-
2PO₃H₂)(CH₂)₂NH(CH₂)₂N(CH₂PO₃H₂)₂ chlorethyleneamine-N,N-di(methylene phosphonic acid)

ClCH₂CH₂N(CH₂PO(OH)₂)₂

$$R_8-\overset{O}{\underset{R_9}{\overset{\|}{P}}}-(CH_2CR_{10})_n-CH_2CHR_{10}CO_2H \quad (9)$$
$$\qquad\qquad\qquad CO_2H$$

or salts thereof, wherein $R_{10}$ is H, $CH_3$, or $C_2H_5$; $R_8$ is H, a straight or branched alkyl residue having from 1–18 carbon atoms, a cycloalkyl residue having from 5–12 carbon atoms, an aryl residue, an alkylaryl residue, or a residue of the formula $$(CH_2CR_{10})_mCH_2CHR_{10}CO_2H$$
$$\qquad\quad CO_2H$$

wherein $R_{10}$ has its previous significance and the sum of n+m is an integer of at most 100, or a residue —OX wherein X is hydrogen or a straight or branched alkyl residue having 1–4 carbon atoms and; $R_9$ is a residue —OX, wherein X has is previous significance.

One exemplary compound, falling within the scope of formula (9) is commercially available and is sold as "Belclene 500" from Ciba Geigy. This molecule has the structure

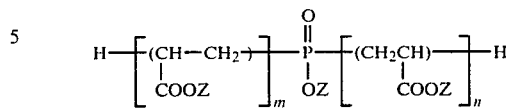

wherein Z is H or a cation, and wherein the sum of n+m is about 2 to 6, and has been referred to as a phosphinocarboxylic acid compound. Compounds of formula (9) above are detailed in U.S. Pat. No. 4,239,648 (Marshall et al), the entire content of this patent is herewith incorporated by reference to the extent necessary to complete the instant disclosure.

As to the zinc compounds which are useful in accordance with the invention, any water soluble zinc salt which provides $Zn^{++}$ ions may be mentioned. Exemplary zinc salts include zinc nitrate, zinc chloride, zinc sulfate, zinc acetate, alkali metal-zinc phosphate glasses, crystalline alkali metal zinc polyphosphates and the like. Also, other zinc compounds which will liberate $Zn^{++}$ in solution, such as zinc oxide, may also be used. The most important criterion is that there be a source of soluble zinc. For example, in addition to adding a zinc salt, this criterion may be satisfied by the use of a process or wastewater stream containing soluble zinc.

Other water soluble polymeric materials may be used in conjunction with the SSMA, zinc, and organo-phosphorus acid combination. For instance, the cellulose materials suitable for such use are referred to herein as cellulose gum. As is known in the art, cellulose is composed of repeating cellobiose units. The cellobiose units are, in turn, composed of two anhydroglucose units with each anhydroglucose unit containing three hydroxy functionalities. By substituting an alkyl group for some of the H atoms of the hydroxy functional groups, cellulose gum is obtained. The average number of hydroxy groups substituted per anhydroglucose unit is known as the degree of substitution, designated DS. Since three hydroxy functions are contained in each anhydroglucose unit, the highest theoretical DS possible is 3.0.

The degree of polymerization of cellulose gum can be expressed by an integer, n, which denotes the number of anhydroglucose units. Since cellulose gums are long chain polymers, their relative chain lengths can be characterized by the number of anhydroglucose units, a molecular weight or a viscosity value.

The phrase cellulose gums in accordance with the invention refers to carboxyloweralkyl cellulose, "modified" carboxyloweralkyl cellulose, and water soluble salts of these materials. The water soluble salts include, inter alia, Na, K, NH₄, and Ca, with the Na salt form being preferred.

Carboxyloweralkyl cellulose, as used herein, refers to cellulose polymers in which some of the H atoms of the hydroxy functional groups of the cellulose molecular are replaced with one or more lower alkylcarboxy groups having from 2–4 carbon atoms. For instance, the H atoms of the hydroxy functions may be replaced by carboxymethyl ($CH_2COOH$), carboxyethyl ($CH_2CH_2COOH$), or carboxypropyl ($CH_2CH_2CH_2COOH$). Further, the alkyl groups themselves may include substituents, such as other hydroxy functions. Examples of the latter include, for instance, carboxy 2-hydroxyethyl (CH(OH)CH$_2$COOH) and carboxy 2-hydroxypropyl (CH$_2$CH(OH)CH$_2$COOH).

"Modified" carboxyloweralkyl cellulose refers to carboxyloweralkyl cellulose molecules as defined above, which, in addition to the replacement of a lower alkyl carboxy group on one or more of the H atoms on the hydroxy functional groups, include a "second" functional group substituted for some of the H atoms of the remaining hydroxy functional groups of the anhydroglucose unit. These "second" functional groups may comprise a substituted or non-substituted lower alkyl group having from 1 to 4 carbon atoms, e.g., methyl, ethyl, propyl, hydroxyethyl, 2-hydroxypropyl, butyl, or 2-hydroxybutyl.

The cellulose gums may be prepared by well known methods. For instance, the sodium salt of the carboxymethyl derivative is produced by reacting alkali cellulose with sodium monochloracetate. The sodium salts of the other carboxyloweralkyl species are similarly produced by reacting the alkali cellulose material with sodium mono chlorpropionate, and sodium monochlorbutyrate respectively.

The cellulose gums suitable for the present invention have a degree of substitution of from about 0.38 to about 2.5 and a molecular weight of from about 50,000 to 250,000. These gums correspond to polymers having degrees of polymerization (n) of from about 300 to 1,200 and a viscosity of less than 20 centipoise (2% gum solution concentration; measured at 25° C. with Brookfield viscometer) to about 1,000 centipoise (2% gum solution concentration; measured at 25° C. with Brookfield viscometer).

The preferred class of cellulose gums are the sodium salts of carboxymethyl cellulose having a viscosity of less than 200 centipoise (2% gum solution concentration, measured at 25° C.). These gums are commercially available from Hercules. The preferred cellulose gum material is designated as the Hercules CMC-7L series and includes Hercules products CMC-7LT, CMC-7L3T, CMC-7L1T, CMC-7L1NT, CMC-7L2NT, etc. The CMC-7L series polymers are believed to have an average molecular weight of less than about 100,000 and a DS of 0.7. The viscosities of such gums range from about 20 centipoises (measured at 25° C. 2% gum concentration) to about 100 centipoises (measured at 25° C. 2% gum concentration). The preferred cellulose gum is sold under the designation "Hercules CMC-7L3T".

Other water soluble polymers which may be conjointly used with the SSMA, zinc, and organo-phosphorus acid combination include water soluble polymers and copolymers comprising repeat unit moieties based upon acrylic acid (hereinafter acrylic acid polymers and copolymers). Such polymers include: the sodium salt form of an acrylic acid homopolymer, copolymers comprising acrylic acid (or water soluble salt forms) repeat units and other repeat units composed of lower alkyl (C$_1$–C$_4$) esters of acrylic acid, and copolymers of acrylic acid (or water soluble salt forms) and hydroxylated lower alkyl (C$_1$–C$_4$) acrylates (See U.S. Pat. No. 4,029,977).

These water soluble acrylic acid polymers and copolymers are well known in the art and are commercially available. For instance, the Goodrich series of sodium polyacrylates known as the Goodrite ® K-700 polymers may be mentioned, as well as acrylic acid/2-hydroxypropylacrylate copolymers available from National Starch. The latter copolymers are presently contemplated as being preferred.

In those instances when the system metallurgy comprises copper, such as in admiralty, binary brasses, binary bronzes, and the like, it is desirable to add, to the combined treatment of the present invention, a water soluble copper inhibitor such as an azole compound. Exemplary copper corrosion inhibitors include 1,2,3-triazole compounds having the formula

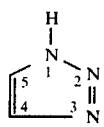

Included within the scope of the invention are N-alkyl substituted 1,2,3-triazole, or a substituted water soluble 1,2,3-triazole where substitution occurs at the 4 and/or 5 position of the ring. The preferred 1,2,3,-triazole is 1,2,3-tolyltriazole of the formula

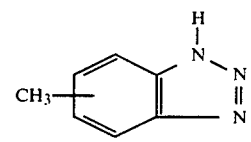

Other exemplary 1,2,3-triazoles include benzotriazole, 4-phenol-1,2,3-triazole, 4-methyl-1,2,3-triazole, 4-ethyl-1,2,3-triazole, 5 methyl-1,2,3-triazole, 5-ethyl-1,2,3-triazole, 5-propyl-1,2,3-triazole, and 5-butyl-1,2,3-triazole. Alkali metal or ammonium salts of these compounds may be used.

Other exemplary copper corrosion inhibitors include thiazole compounds of the formula:

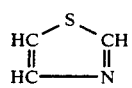

Suitable thiazoles include thiazole, 2-mercaptothiazole, 2-mercaptobenzothiazole, benzothiazole, and the like.

Soluble molybdate compounds may also be used for enhanced corrosion protection. Suitable molybdates include alkali molybdate salts. Exemplary compounds include, inter alia, sodium molybdate, potassium molybdate, lithium molybdate. Also, ammonium molybdate compounds, such as ammonium dimolybdate and ammonium heptamolybdate may be mentioned.

Operable dosage ranges for the method herein, per million parts of the aqueous system, are as follows:

| | |
|---|---|
| SSMA | .5 to about 50 ppm |
| Zinc compound | 0.1 ppm to about 15 ppm (as Zn ion) |
| Organo-phosphorus compound | .2 ppm to about 50 ppm |
| Cellulose Gum and/or acrylic acid containing polymer (when present) | .5 to about 50 ppm |
| Azole (when present) | .2 to about 30 ppm |
| Molybdate, salt (when present) | 0.1 to about 100 ppm (as Molybdate ion) |

Preferred dosages are:

| | |
|---|---|
| SSMA | 1 ppm to about 25 ppm |
| Zinc compound | 0.1 ppm to about 10 ppm (as $Zn^{+2}$) |
| Organo-phosphorus compound | .2 ppm to about 15 ppm |
| Cellulose Gum and/or acrylic acid containing polymer (when present) | 1 ppm to about 25 ppm |
| Azole (when present) | .2 ppm to about 10 ppm |
| Molybdate (when present) | 0.1 ppm to about 15 ppm (as Molybdate) |

It is preferred to feed the organo-phosphorus compound, SSMA, and azole together to the system, while separately supplying the $zinc^{2+}$ ion source. Alternatively, all of the ingredients may be combined in, and supplied as, a single product.

Based upon presently available data, when both optimal corrosion protection and scaling control are desired, it is preferred to utilize a treatment composition comprising SSMA, zinc, 1-hydroxyethylidenediphosphonic acid and tolyltriazole.

The composition of the present invention may be packaged in a single barrel or in two barrels. At present, it is preferred that a double barrel approach be used, with the zinc being provided in a separate barrel.

Contemplated composition concentration ranges are (wt. %):

| | |
|---|---|
| SSMA | 1-20% |
| Organo-Phosphorus Compound | 1-10% |
| Copper Corrosion Inhibitor | 0-5% |
| Zinc | 0.5-2.0% |
| Water | Remainder (to add up to 100%) |

To enhance the solubility of the various composition components, a basic material, such as caustic soda, may be added. Presently available data indicates that an acceptable caustic soda concentration range is from about 5-20% (wt %). When the water soluble cellulose gum material and/or water soluble acrylic acid polymers are used in addition to the SSMA component, they can be fed in a separate drum or combined with the SSMA. These materials are present in an amount of from about 1-10% (total cellulose gum and/or water soluble acrylic acid polymer).

SPECIFIC EXAMPLES

The invention is further illustrated by the following examples which are intended merely for the purpose of illustration and are not to be regarded as limiting the scope of the invention or the manner in which it may be practiced.

Procedure

In order to evaluate the efficacy of the treatment of the present invention as corrosion and scale control agents for cooling water systems, tests were conducted in a Recirculator Test System. The recirculator system is designed to provide a realistic measure of the ability of a treatment to prevent corrosion and fouling under heat transfer conditions. In this system treated water is circulated by a centrifugal pump through a corrosion coupon by-pass rack, into which corrosion coupons (admiralty brass and/or mild steel) are inserted, and past a mild steel (AISI-1010) heat exchanger tube contained in a plexiglass block. The heat exchanger tube is fitted with an electrical heater so that the heat load on the tube can be varied and controlled in the 0 to 16,000 $BTU/ft^2/hr$ range. The water velocity past the corrosion coupons and heat exchanger tube is equivalent at any given flow rate and can be controlled anywhere from 0 to 4.5 ft/sec.

The pH and temperature of the circulating water are automatically controlled. The treated water is prepared by chemical addition to deionized water. Provisions for continuous make-up and blowdown are made by pumping fresh treated water from supply tanks to the sump of the unit, with overflow from the sump serving as blowdown. The total system volume of the recirculating system is about 11 liters. The circulating water is aerated to insure oxygen saturation.

Corrosion rates are determined by exposing pre-cleaned and weighed metal specimens for a specified period of time, after which they are removed, cleaned and reweighed. Corrosion rates are calculated by a weight loss method. This weight loss for the specified period is utilized to compute a corrosion rate, and is reported as mils per year (mpy).

EXAMPLE I

Recirculator studies were used to demonstrate the unique and unexpected results given by compositions of the present invention. The studies were conducted in a pH=8.5 cooling water system supersaturated with respect to calcium carbonate, containing: 600 ppm calcium (as ppm $CaCO_3$), 200 ppm magnesium (as ppm $CaCO_3$) and 230 ppm "M" alkalinity (as ppm $CaCO_3$). The cooling water was fed to the system at the rate of one system volume per day; this is equivalent to a retention time of 1.4 day (75% depletion). The bulk circulating water was maintained at T=120° F. The water velocity past both the corrosion coupons and heat exchanger tube was maintained at 1.5 ft./sec. A mild steel (AISI-1010) heat exchanger tube was used as the heat transfer surface; the heat load (heat flux) on the tube was 16,000 $BTU/ft^2/hr$. The aforementioned water chemistry and test conditions makes this system highly prone to scaling and difficult to treat with respect to mild steel corrosion. Results from these studies are summarized in Table-1.

TABLE 1

| | Treatment | | | | | | Corrosion Rate, mpy | | |
|---|---|---|---|---|---|---|---|---|---|
| Polymer | ppm HEDP | ppm $Zn^{+2}$ | ppm TTA | ppm $Na_2MoO_4$ | ppm MBT | ppm Total Treatment | Mild Steel | Admiralty Brass | Remarks (with respect to heat exchanger) |
| (1) No polymer | 6 | 2 | — | | | 8 | 29 | 1 | Severe corrosion and scaling of heat exchanger tube. |
| (2) 15 ppm SSMA | 6 | 2 | — | | | 23 | 7.8 | 1 | Heat exchanger tube free of corrosion and deposition. |
| (3) No polymer | 17.3 | 5.7 | — | | | 23 | 11.1 | 0.8 | Severe scaling and under-deposit corrosion (pitting) of heat exchanger tube. |

TABLE 1-continued

| | Treatment | | | | | ppm Total Treatment | Corrosion Rate, mpy | | |
|---|---|---|---|---|---|---|---|---|---|
| Polymer | ppm HEDP | ppm $Zn^{+2}$ | ppm TTA | ppm $Na_2MoO_4$ | ppm MBT | | Mild Steel | Admiralty Brass | Remarks (with respect to heat exchanger) |
| (4) 30 ppm SSMA | 17.3 | 5.7 | — | | | 53 | 1.5 | 0.3 | Heat exchanger tube free of corrosion and deposition. |
| (5) No polymer | 39.75 | 13.25 | — | | | 53 | 9 | 0.3 | Severe scaling and under-deposit corrosion of heat exchanger tube. |
| (6) 15 ppm SSMA | 6 | 2 | 5 | | | 28 | 3.1 | 0.8 | No significant corrosion or deposition of heat exchanger tube. |
| (7) 15 ppm SSMA | — | 2 | — | | | 17 | 6.3 | 1.2 | Heat exchanger tube covered with uniform deposit; pitting of surface. |
| (8) 15 ppm SSMA | 6 | — | — | | | 21 | 11.5 | 1.2 | Severe localized corrosion of heat exchanger tube. |
| (9) 15 ppm Polymer A | 6 | 2 | — | | | 23 | 24 | 0.5 | Severe scaling and under-deposit corrosion of heater exchanger tube. |
| (10) 15 ppm Polymer A | 6 | 2 | 5 | | | 28 | 6.8 | 0.7 | Severe scaling and under-deposit corrosion of heat exchanger tube. |
| (11) 15 ppm Polymer B | 6 | 2 | — | | | 23 | 14.3 | 0.5 | Severe scaling of heat exchanger tube. |
| (12) 15 ppm Polymer B | 6 | 2 | 5 | | | 28 | 3.5 | 0.8 | Severe scaling of heat exchanger tube. |
| (13) 15 ppm Polymer C | 6 | 2 | | | | 23 | 17 | 0.8 | Thin, uniform deposit covering heat exchanger tube. Severe localized corrosion of heat exchanger surface. |
| (14) 15 ppm Polymer D | 6 | 2 | | | | 23 | 14.5 | 0.8 | Severe scaling and under-deposit corrosion of heat exchanger tube. |
| (15) 15 ppm Polymer E | 6 | 2 | | | | 23 | 3.8 | 0.8 | Severe scaling of heat exchanger tube; some under-deposit corrosion. |
| (16) 15 ppm Polymer F | 6 | 2 | | | | 23 | 14.8 | 0.7 | Severe scaling of heat exchanger tube; some under-deposit corrosion. |
| (17) No polymer | 6 | 2 | | 5 | 5 | 18 | 1.6 | 1.0 | Thin, uniform deposit covering heat exchanger tube; no significant corrosion. |
| (18) No polymer | 10.8 | 3.36 | | 8.41 | 8.41 | 30.98 | 2.3 | 1.2 | Severe scaling of heat exchanger tube; some under-deposit corrosion. |
| (19) 15 ppm SSMA | 2.4 | 2 | | 5 | 5 | 29.4 | 1.0 | 0.7 | Heat exchanger tube free of deposition; no significant corrosion. |

SSMA -Sulfonated styrene/maleic anhydride copolymer; SS:MA mole ratio = 3:1; MW ≈ 4,000
Polymer A -Polymethacrylic acid, sodium salt; MW = 6,000 to 8,000
Polymer B -Sulfonated polystyrene; MW = 70,000
Polymer C -Diisobutylene/maleic anhydride copolymer; MW = 2,000 to 2,400
Polymer D -Partially hydrolyzed polyacrylamide; MW = 5,000≠Polymer E -Polymaleic anhydride; MW = 1,000
Polymer F -Polyacrylic acid; MW = 5,000
MBT -Mercaptobenzothiazole
TTA -Tolyltriazole
HEDP -Hydroxyethylidene diphosphonic acid
$Zn^{+2}$-$ZnSO_4.H_2O$, source of $Zn^{+2}$

Discussion Table 1

Examples 2, 4, 6, and 19 clearly indicate the enhanced results attendant upon use of the present invention. In all of these tests, the heat exchanger tube was relatively free from scaling and deposition, and the corrosion rates of the mild steel and admiralty brass coupons were excellent. In sharp contrast, a composition comprising phosphonate and SSMA polymer only (run #8) resulted in severe localized corrosion of the heat exchanger tube.

Substitution of other polymers for SSMA, such as in runs 9–16, consistently resulted in unacceptable scaling of the heat exchanger tube, and, in most instances unacceptable coupon corrosion rates were seen. Likewise, when no polymer was used, as in runs 1, 3, 5, and 17–18, severe corrosion and heat exchanger scaling occurred in most cases.

EXAMPLE II

Additional recirculator studies were performed with a number of compositions of the present invention in a variety of cooling waters and under various conditions of heat load and water velocity to demonstrate the general scope and applicability of the present invention. The treatment programs tested are summarized after Table-II. The results of these tests along with the water chemistries, water velocities, and heat loads employed in the studies are presented in Table II. As in Example I, the temperature of the circulating water was 120° F., the make-up rate was 1 system volume per day, and the heat exchanger tube was of mild steel metallurgy (AISI-1010). All of the water chemistries utilized in the studies were supersaturated with calcium carbonate. Additionally, the water chemistries and test conditions were such that the system was prone to deposition from both chemical and natural scales.

TABLE 2

| | | Water Chemistry | | | | | | Corrosion Rate, mpy | | |
|---|---|---|---|---|---|---|---|---|---|---|
| Ex. | Treatment | ppm $Ca^{+2}$ as $CaCO_3$ | ppm $Mg^{+2}$ as $CaCO_3$ | ppm "M" Alkalinity as $CaCO_3$ | pH | Water Velocity ft/sec | Heat Flux $BTU/ft^2/hr$ | Mild Steel | Admiralty Brass | Remarks |
| 1 | A | 600 | 200 | 200 | 8.5 | 3.0 | 8,000 | 0.7 | 1.0 | Heat exchanger tube free of corrosion and deposition. |

TABLE 2-continued

| Ex. | Treatment | Water Chemistry | | | | Water Velocity ft/sec | Heat Flux BTU/ft²/hr | Corrosion Rate, mpy | | Remarks |
| | | ppm Ca$^{+2}$ as CaCO$_3$ | ppm Mg$^{+2}$ as CaCO$_3$ | ppm "M" Alkalinity as CaCO$_3$ | pH | | | Mild Steel | Admiralty Brass | |
| --- | --- | --- | --- | --- | --- | --- | --- | --- | --- | --- |
| 2 | A | 900 | 300 | 220 | 8.6 | 3.0 | 8,000 | 1.2 | 1.0 | Same as Example-1. |
| 3 | A | 1500 | 300 | 260 | 8.5 | 3.0 | 8,000 | 1.2 | 1.0 | Same as Example-1. |
| 4 | B | 900 | 300 | 220 | 8.5 | 3.0 | 8,000 | 1.0 | 0.7 | Same as Example-1. |
| 5 | C | 900 | 300 | 250 | 8.5 | 3.0 | 8,000 | 1.3 | 0.7 | Same as Example-1. |
| 6 | D | 600 | 200 | 250 | 8.5 | 1.5 | 16,000 | 1.3 | — | Same as Example-1. |
| 7 | E | 600 | 200 | 260 | 8.5 | 1.5 | 16,000 | 0.9 | — | Same as Example-1. |
| 8 | F | 600 | 200 | 280 | 9.0 | 1.5 | 16,000 | 0.6 | — | Same as Example-1. |
| 9 | G | 600 | 200 | 230 | 8.5 | 1.5 | 16,000 | 0.7 | — | Same as Example-1. |
| 10 | H | 900 | 300 | 200 | 8.5 | 3 | 8,000 | 1.2 | — | Same as Example-1. |
| 11 | D | 1000 | 333 | 200 | 8.5 | 1.5 | 16,000 | 1.2 | — | Same as Example-1. |
| 12 | I | 600 | 300 | 200 | 8.5 | 1.5 | 16,000 | 1.4 | — | Same as Example-1. |

| Treatments | Concentration |
| --- | --- |
| A. 1-Hydroxyethylidene-1,1 diphosphonic acid (HEDP) | 6 ppm |
| Tolyltriazole (TTA) | 5 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 15 ppm |
| B. 2-Phosphono-butane 1,2,4-tricarboxylic acid | 6 ppm |
| Benzotriazole | 5 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 15 ppm |
| C. Hexamethylene diamine-N,N,N',N'—tetra (methylene phosphonic acid) | 6 ppm |
| Benzotriazole | 5 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 15 ppm |
| D. 1-Hydroxyethylidene-1,1 diphosphonic acid | 6 ppm |
| Tolyltriazole | 3 ppm |
| Zinc sulfate, monohydrate | 5.5 ppm (2 ppm Zn$^{+2}$) |
| Sulfonated styrene/maleic anhydride copolymer (SS:MA mole ratio = 3:1; MW ≅ 4,000) | 15 ppm |
| E. 1-Hydroxyethylidene-1,1 diphosphonic acid (HEDP) | 6 ppm |
| 2-Phosphono-butane 1,2,4-tricarboxylic acid | 2.5 ppm |
| Tolyltriazole | 3 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 10 ppm |
| F. 1-Hydroxyethylidene-1,1 diphosphonic acid | 6 ppm |
| Tolyltriazole | 3 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 20 ppm |
| G. 1-Hydroxyethylidene-1,1 diphosphonic acid | 6 ppm |
| Tolyltriazole | 3 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 7.5 ppm |
| Carboxymethylcellulose (CMC-7L3T) | 7.5 ppm |
| H. 1-Hydroxyethylidene-1,1 diphosphonic acid | 6 ppm |
| Tolyltriazole | 3 ppm |
| Zinc sulfate, monohydrate | 5.5 ppm - (2 ppm Zn$^{+2}$) |
| Sulfonated styrene/maleic anhydride copolymer (SS:MA mole ratio = 3:1; MW ≅ 4,000) | 10 ppm |
| Carboxymethylcellulose (CMC-7L3T) | 5 ppm |
| I. 1-Hydroxyethylidene 1,1 diphosphonic acid | 6 ppm |
| Tolyltriazole | 3 ppm |
| Zinc sulfate, monohydrate | 5.5 ppm - (2 ppm Zn$^{+2}$) |
| Sulfonated styrene/maleic anhydride copolymer (SS:MA mole ratio = 1:1; MW ≅ 4,000) | 15 ppm |

EXAMPLE 3

To further illustrate the unique and unexpected behavior of the compositions of the present invention, recirculator studies were conducted in deionized water, at pH=8.5. In these studies the water velocity past the corrosion coupons and mild steel heat exchanger tube were controlled to give 3 ft/sec. The heat load (heat flux) on the heat exchanger tube was maintained at 8,000 BTU/-ft²/hr. As in the previous examples, the temperature of the circulating water was 120° F. and the make-up rate was 1 system volume per day.

As can be seen from Table-3, a composition of the present invention provided excellent corrosion control in a water void of scale forming ions. Whereas, the same combination without the SSMA was not only ineffective, but actually accelerated mild steel corrosion.

TABLE 3

Example 3 Treatment

| | Polymer | ppm HEDP | ppm TTA | ppm Zn$^{+2}$ | Mild Steel Corrosion Rate, in mpy | Remarks |
| --- | --- | --- | --- | --- | --- | --- |
| (1) | No Treatment | | | | 150 | Severe corrosion of heat transfer surface. |
| (2) | No Polymer | 6 | 3 | 2 | 210 | Same as 1. |
| (3) | 10 ppm SSMA | 6 | 3 | 2 | 0.9 | No significant corrosion. |

HEDP = 1-hydroxyethylidene-1,1 diphosphonic acid
TTA = tolyltriazole

It is my information and belief that the following compositions according to this invention would show similar corrosion and scale reduction results when tested by the procedures above described.

EXAMPLE 4

Composition comprising 8% SSMA (SS:MA molar ratio 3:1, MW≃4,000), 1.0% zinc, 5% nitrilo tris (methylene phosphonic acid), 4% homopolymer sodium polyacrylate (MW≃2,100), water in sufficient amount to add up to 100%.

EXAMPLE 5

Composition comprising 5% SSMA (SS:MA molar ratio 3:1, MW≃4,000), 1.0% zinc, 3% hydroxypropylidene diphosphonic acid, 2% homopolymer sodium polyacrylate (MW≃6,000), water in sufficient amount to add up to 100%.

EXAMPLE 6

Composition comprising 15% SSMA (SS:MA molar ratio 1:1 MW≃1,600), 2.0% zinc, 10% "Belclene 500", 10% copolymer acrylic acid/methylacrylate (AA:MA molar ratio 3:1, MW 4,000≃6,000), water in sufficient amount to add up to 100%.

EXAMPLE 7

Composition comprising 4% SSMA (SS:MA molar ratio 3:1 MW≃4,000), 1.0% zinc, 1% 2-amino-ethylphosphonic acid, 4% carboxymethylcellulose (CMC-7L3T), 4% acrylic acid/2 hydroxypropylacrylate copolymer (molar ratio AA/HPA=3:1, MW≃6,000), water in sufficient amount to add up to 100%.

EXAMPLE 8

Composition comprising 8% SSMA (SS:MA molar ratio 3:1 MW≃4,000), 1.0% zinc, 6% 1-hydroxyethylidene 1,1-diphosphonic acid, 8% acrylic acid/hydroxyethylacrylate copolymer (molar ratio AA/HEA=3:1, MW≃6,000), water in sufficient amount to add up to 100%.

Whereas I have shown and described herein certain embodiments of the present invention, it is intended that these be covered as well as any change or modification therein which may be made without departing from the spirit and scope of the invention.

I claim:

1. Method of treating cooling water systems of the type prone to scale formation on, and corrosion of, metallic parts in contact with said cooling water system, said method comprising the steps of adding to said cooling water system
   (1) from about 0.1 to about 15 parts per million of a water soluble zinc compound adapted to liberate $Zn^{2+}$ ions in solution;
   (2) from about 0.5 to about 50 parts per million of a water soluble sulfonated styrene/maleic anhydride copolymer, said copolymer comprising sulfonated styrene moieties of the formula

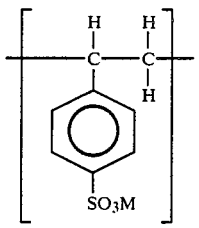

and moieties derived from maleic anhydride of the formula

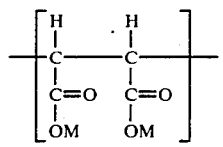

wherein M is H or a water soluble cation, and
   (3) from about 0.2 to about 50 parts per million of an organo-phosphorus acid compound or water soluble salt thereof, all (1) (2) and (3) being based on 1 million parts of said cooling water system.

2. Method as defined in claim 1 wherein said organo-phosphorus acid compound comprises a member or water soluble salt of such member selected from the group of compounds represented by the formulas

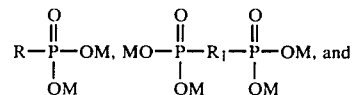

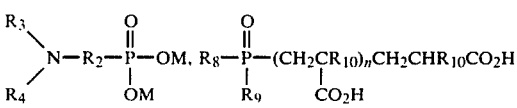

wherein R is lower alkyl having from about one to six carbon atoms, substituted lower alkyl of 1–6 carbon atoms, a mononuclear aryl radical, or substituted mononuclear aromatic; M is a water soluble cation; $R_1$ is alkylene having from 1 to about 12 carbon atoms or a substituted alkylene having from about 1 to about 12 carbon atoms; $R_2$ is a lower alkylene having from about one to about four carbon atoms, or an amino or hydroxy substituted lower alkylene; $R_3$ is H, OH, $NH_2$, substituted amino, an alkyl having from one to six carbon atoms, an hydroxy or amino substituted alkyl of from one to six carbon atoms, a mononuclear aromatic radical and an hydroxy or amino substituted mononuclear aromatic radical $R_4$ is $R_3$ or the group represented by the formula

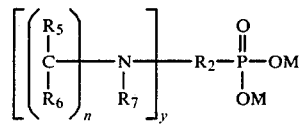

where $R_5$ and $R_6$ are each hydrogen, lower alkyl of from about one to six carbon atoms, an hydroxy or amino substituted lower alkyl, hydrogen, hydroxyl, amino group, substituted amino group, a mononuclear aromatic radical, and an hydroxy or amino substituted mononuclear aromatic radical; $R_7$ is $R_5$, $R_6$, or the group $R_2-PO_3M_2$ ($R_2$ is as defined above); n is a number of from 1 through about 15; y is a number of from about 1 through about 14; $R_{10}$ is H, $CH_3$ or $C_2H_5$; $R_8$ is H, a straight or branched alkyl residue having from 1–18 carbon atoms, a cycloalkyl residue having from 5–12 carbon atoms, an aryl residue, an alkylaryl residue, or a residue of the formula:

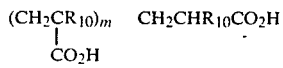

wherein $R_{10}$ has its previous significance and the sum of $n+m$ is an integer of at most 100, or a residue —OX wherein X is hydrogen or a straight or branched alkyl residue having 1–4 carbon atoms and; $R_9$ is a residue —OX, wherein X has its previous significance.

3. Method as defined in claim 2 wherein said organophosphorus acid comprises 1-hydroxyethylidene 1,1-diphosphonic acid.

4. Method as defined in claim 2 wherein said organophosphorus acid compound comprises 2-phosphonobutane 1,2,4-tricarboxylic acid.

5. Method as defined in claim 2 wherein said organophosphorus acid compound comprises nitrilo-tris(-methylene phosphonic acid).

6. Method as defined in claim 2 wherein said organophosphorus acid compound comprises a phosphinocarboxylic acid compound having the formula

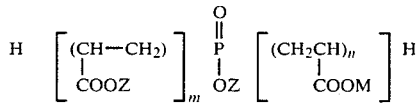

wherein Z is H or a cation, and wherein the sum of $n+m=2$ to 6.

7. Method as defined in claim 2 wherein said organophosphorus acid compound comprises hexamethylene diamine-N,N,N',N'-tetra(methylene phosphonic acid).

8. Method as defined in claim 2 wherein said organophosphorus acid compound comprises a mixture of 1-hydroxyethylidene 1,1-diphosphonic acid and 2-phosphonobutane 1,2,4-tricarboxylic acid.

9. Method as defined in claim 2 further comprising adding an effective amount of a cellulose gum material to said cooling water system.

10. Method as defined in claim 9 wherein said cellulose gum material comprises sodium carboxymethylcellulose.

11. Method as defined in claim 9 wherein said sodium carboxymethylcellulose has a viscosity of less than about 200 centipoise (2% gum solution concentration, measured at 25° C.).

12. Method as defined in claim 9 wherein said cellulose gum material (4) is added in an amount of between about 0.5 to about 50 ppm, all (1), (2), (3) and (4) being based upon one million parts of said cooling water system.

13. Method as defined in claim 2 further comprising adding to said cooling water system an effective amount of a water soluble acrylic acid polymer or copolymer.

14. Method as recited in claim 13 wherein said water soluble acrylic acid polymer or copolymer comprises a homopolymer of polyacrylic acid or a water soluble salt form thereof.

15. Method as recited in claim 13 wherein said water soluble acrylic acid polymer or copolymer comprises a water soluble copolymer comprises a water soluble copolymer of acrylic acid and hydroxylated lower alkylacrylate.

16. Method as recited in claim 15 wherein said copolymer comprises acrylic acid/2 hydroxypropylacrylate having a molecular weight of about 6,000 and a molar ratio of acrylic acid to 2 hydroxypropylacrylate of 3:1.

17. Method as recited in claim 15 wherein said copolymer comprises acrylic acid/hydroxethylacrylate.

18. Method as recited in claim 13 wherein said water soluble acrylic acid polymer or copolymer comprises a water soluble copolymer having repeat units composed of acrylic acid moieties and repeat units composed of lower alkyl ($C_1$–$C_4$) esters of acrylic acid.

19. Method as recited in claim 18 wherein said copolymer comprises an acrylic acid/methylacrylate copolymer having a molecular weight of about 6,000 and a molar ratio of acrylic acid to methylacrylate moieties of about 3:1.

20. Method as defined in claim 13 wherein said water soluble acrylic acid polymer or copolymer (4) is added to an amount of between about 0.5 to about 50 ppm, all (1), (2), (3) and (4) being based upon one million parts of said cooling water system.

21. Method as defined in claim 2 further comprising, adding to said water system, an effective amount of a corrosion inhibitor compound selected from the group consisting of effective azole compounds and effective molybdate compounds.

22. Method as defined in claim 19 wherein said corrosion inhibitor compound comprises tolyltriazole.

23. Method as defined in claim 19 wherein said corrosion inhibitor compound comprises mercaptobenzothiazole.

24. Method as defined in claim 1 wherein said organophosphorus acid compound (3) is added in an amount of between about 0.2 to about 15 ppm, said zinc compound (1) being added in an amount of between about 0.1 to about 10 ppm, and said sulfonated styrene/maleic anhydride copolymer (2) being added in an amount of between about 1 ppm to about 25 ppm.

* * * * *